US010882382B2

(12) United States Patent
Otsubo

(10) Patent No.: US 10,882,382 B2
(45) Date of Patent: Jan. 5, 2021

(54) APPARATUS FOR WINDOW

(71) Applicant: AGC INC., Tokyo (JP)

(72) Inventor: Nozomi Otsubo, Tokyo (JP)

(73) Assignee: AGC INC., Tokyo (JP)

( * ) Notice: Subject to any disclaimer, the term of this patent is extended or adjusted under 35 U.S.C. 154(b) by 245 days.

(21) Appl. No.: 16/001,826

(22) Filed: Jun. 6, 2018

(65) Prior Publication Data

US 2018/0281569 A1 Oct. 4, 2018

Related U.S. Application Data

(63) Continuation of application No. PCT/JP2016/086100, filed on Dec. 5, 2016.

(30) Foreign Application Priority Data

Dec. 16, 2015 (JP) .................................. 2015-245061

(51) Int. Cl.
*B60J 1/18* (2006.01)
*E05C 9/00* (2006.01)
(Continued)

(52) U.S. Cl.
CPC ............... *B60J 1/1853* (2013.01); *B60J 1/16* (2013.01); *B60J 1/18* (2013.01); *E05C 9/00* (2013.01);
(Continued)

(58) Field of Classification Search
CPC .... B60J 1/16; B60J 1/18; B60J 1/1853; E05D 15/1047; E05D 15/10; E05F 15/655; E05F 15/646
(Continued)

(56) References Cited

U.S. PATENT DOCUMENTS 3,827,184 A * 8/1974 Pennec ............... E05B 65/0864
49/449
7,464,501 B2 * 12/2008 Arimoto ............... E05F 15/646
49/209
(Continued)

FOREIGN PATENT DOCUMENTS

EP 1659247 A1 * 5/2006 ......... E05D 15/1047
JP S59-67462 U 5/1984
(Continued)

OTHER PUBLICATIONS

International Search Report with English language translation and Written Opinion issued in International Application No. PCT/JP2016/086100 dated Jan. 24, 2017.

*Primary Examiner* — Marcus Menezes
(74) *Attorney, Agent, or Firm* — Foley & Lardner LLP

(57) ABSTRACT

An apparatus for window used for moving a sliding window plate between an insertion position to be inserted into an opening portion of a fixed window plate, an extraction position to be extracted from the opening portion, and an open position to be shifted in a slide direction from the extraction position and to uncover the opening portion, includes a rotary member rotatably supported with respect to the sliding window plate; a drive member moved in a predetermined direction with respect to the sliding window plate; a fixation guide configured to convert a movement of the drive member in the predetermined direction with respect to the sliding window plate into a movement of the sliding window plate in an extraction/insertion direction with respect to the fixed window plate; and a wire configured to pull and move the drive member in the predetermined direction.

9 Claims, 9 Drawing Sheets

(51) Int. Cl.
  *E05D 15/10* (2006.01)
  *E05F 11/04* (2006.01)
  *E05F 15/646* (2015.01)
  *E05F 15/655* (2015.01)
  *E05F 11/53* (2006.01)
  *B60J 1/16* (2006.01)

(52) U.S. Cl.
  CPC ......... *E05D 15/10* (2013.01); *E05D 15/1047* (2013.01); *E05F 11/04* (2013.01); *E05F 11/535* (2013.01); *E05F 15/646* (2015.01); *E05F 15/655* (2015.01); *E05Y 2900/55* (2013.01)

(58) Field of Classification Search
  USPC .......................................................... 49/413
  See application file for complete search history.

(56) References Cited

U.S. PATENT DOCUMENTS

| | | | | |
|---|---|---|---|---|
| 7,673,419 | B2* | 3/2010 | Arimoto | B60J 1/1853 296/146.16 |
| 2005/0044799 | A1* | 3/2005 | Kinross | E05D 15/0652 49/413 |
| 2006/0260205 | A1* | 11/2006 | Dufour | B60J 1/1853 49/413 |
| 2009/0183434 | A1* | 7/2009 | Puotunen | B60J 1/14 49/209 |
| 2010/0122497 | A1* | 5/2010 | Lahnala | E05D 15/06 49/413 |
| 2011/0006558 | A1* | 1/2011 | Giret | B60J 1/16 296/146.15 |
| 2012/0167469 | A1* | 7/2012 | Maltaverne | B60J 1/16 49/360 |
| 2017/0254131 | A1* | 9/2017 | Otsubo | E05F 11/535 |
| 2019/0184793 | A1* | 6/2019 | Murasawa | E05F 15/646 |

FOREIGN PATENT DOCUMENTS

| | | |
|---|---|---|
| JP | 2008-114840 A | 5/2008 |
| JP | 2015-105087 A | 6/2015 |

* cited by examiner

APPARATUS FOR WINDOW

CROSS-REFERENCE TO RELATED APPLICATION

The present application is a continuation application filed under 35 U.S.C. 111(a) claiming benefit under 35 U.S.C. 120 and 365(c) of PCT International Application No. PCT/JP2016/086100 filed on Dec. 5, 2016 and designating the U.S., which claims priority of Japanese Patent Application No. 2015-245061 filed on Dec. 16, 2015. The entire contents of the foregoing applications are incorporated herein by reference.

BACKGROUND OF THE INVENTION

1. Field of the Invention

The disclosure herein generally relates to an apparatus for window.

2. Description of the Related Art

A vehicle window disclosed in Japanese Unexamined Patent Application Publication No. 2015-105087 is a side window provided with a sliding window in an opening of a fixed glass so as to open and close. When a lock releasing handle is operated to be pushed backward, the sliding window is displaced to an indoor side of a vehicle according to the operation force. When the handle is further operated to be pushed in the same direction, the sliding window is opened.

SUMMARY OF THE INVENTION

Technical Problem

Conventionally, for a transmission of force, a link mechanism configured of an L-shaped link lever, a connection rod, and the like, has been used. Because when a force is transmitted, a link is displaced with respect to another link, a large space for a transmission path of force has been required.

The present invention was made in view of such a problem, and it is an object of the present invention to provide an apparatus for window that can reduce a space for a transmission path for force.

Solution to Problem

In order to solve the aforementioned problem, according to an aspect of the present invention, an apparatus for window used for moving a sliding window plate between an insertion position, at which the sliding window plate is inserted into an opening portion of a fixed window plate, an extraction position, at which the sliding window plate is extracted from the opening portion, and an open position, at which the sliding window plate is shifted in a slide direction that is different from an extraction/insertion direction from the extraction position, and the sliding window plate uncovers the opening portion, including a rotary member that is rotatably supported with respect to the sliding window plate;

a drive member that is moved in a predetermined direction that is different from the extraction/insertion direction with respect to the sliding window plate according to a rotation force of the rotary member;

a fixation guide configured to convert a movement of the drive member in the predetermined direction with respect to the sliding window plate into a movement of the sliding window plate in the extraction/insertion direction with respect to the fixed window plate; and a wire configured to pull the drive member in the predetermined direction according to the rotation force of the rotary member, and move the drive member in the predetermined direction, is provided.

Advantageous Effect of Invention

According to an aspect of the present invention, an apparatus for window that can reduce a space for a transmission path for force is provided.

BRIEF DESCRIPTION OF THE DRAWINGS

Other objects and further features of embodiments will become apparent from the following detailed description when read in conjunction with the accompanying drawings, in which.

DETAILED DESCRIPTION OF THE PREFERRED EMBODIMENTS

Figure 1:
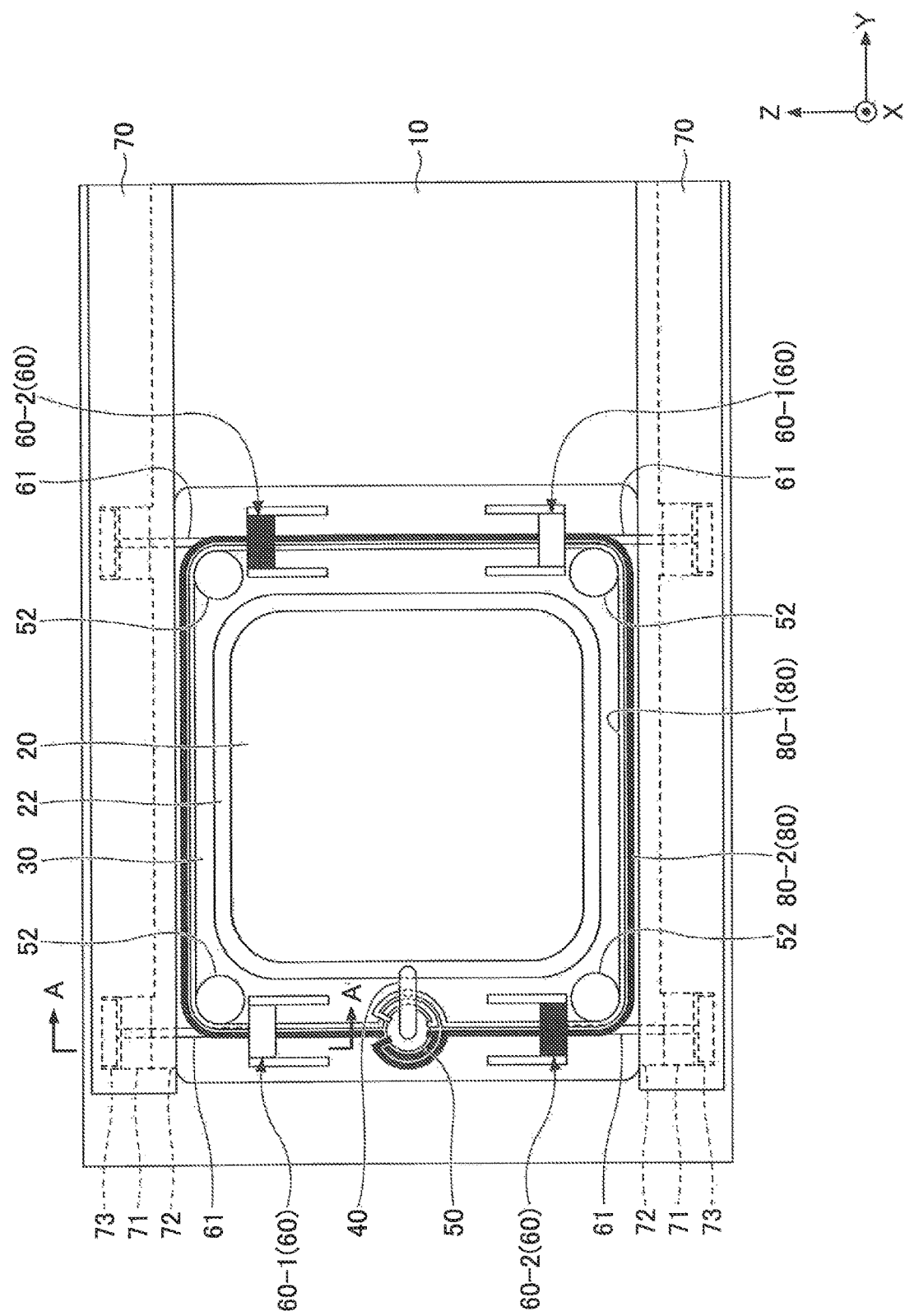
FIG. 1 is a diagram depicting a state of an apparatus for window according to a first embodiment when a sliding window plate is located at an insertion position.

In the following, with reference to drawings, embodiments of the present invention will be described. In each drawing, the same or corresponding reference numeral is assigned to the same or corresponding components, and redundant explanation will be omitted. In each drawing, an X-direction is an extraction/insertion direction, a Y-direction is different from the X-direction and is a slide direction, and a Z-direction is different from the X-direction and the Y-direction. In each drawing, the X-direction, the Y-direction and the Z-direction are orthogonal to one another, but may not be orthogonal to one another and may be obliquely crossed with one another.

First Embodiment

Figure 2:
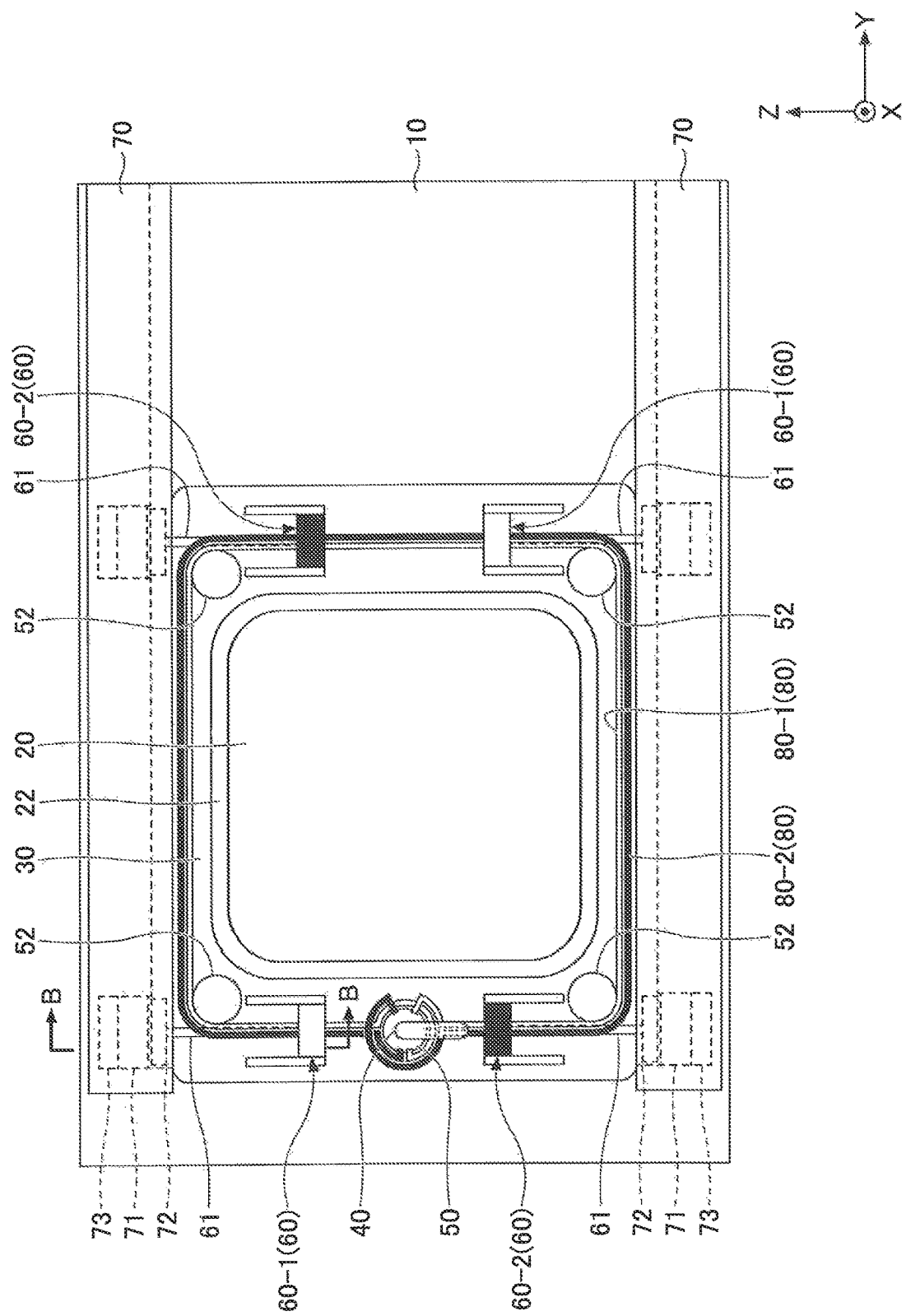
FIG. 2 is a diagram depicting a state of the apparatus for window according to the first embodiment when the sliding window plate is located at an extraction position.
Figure 3:
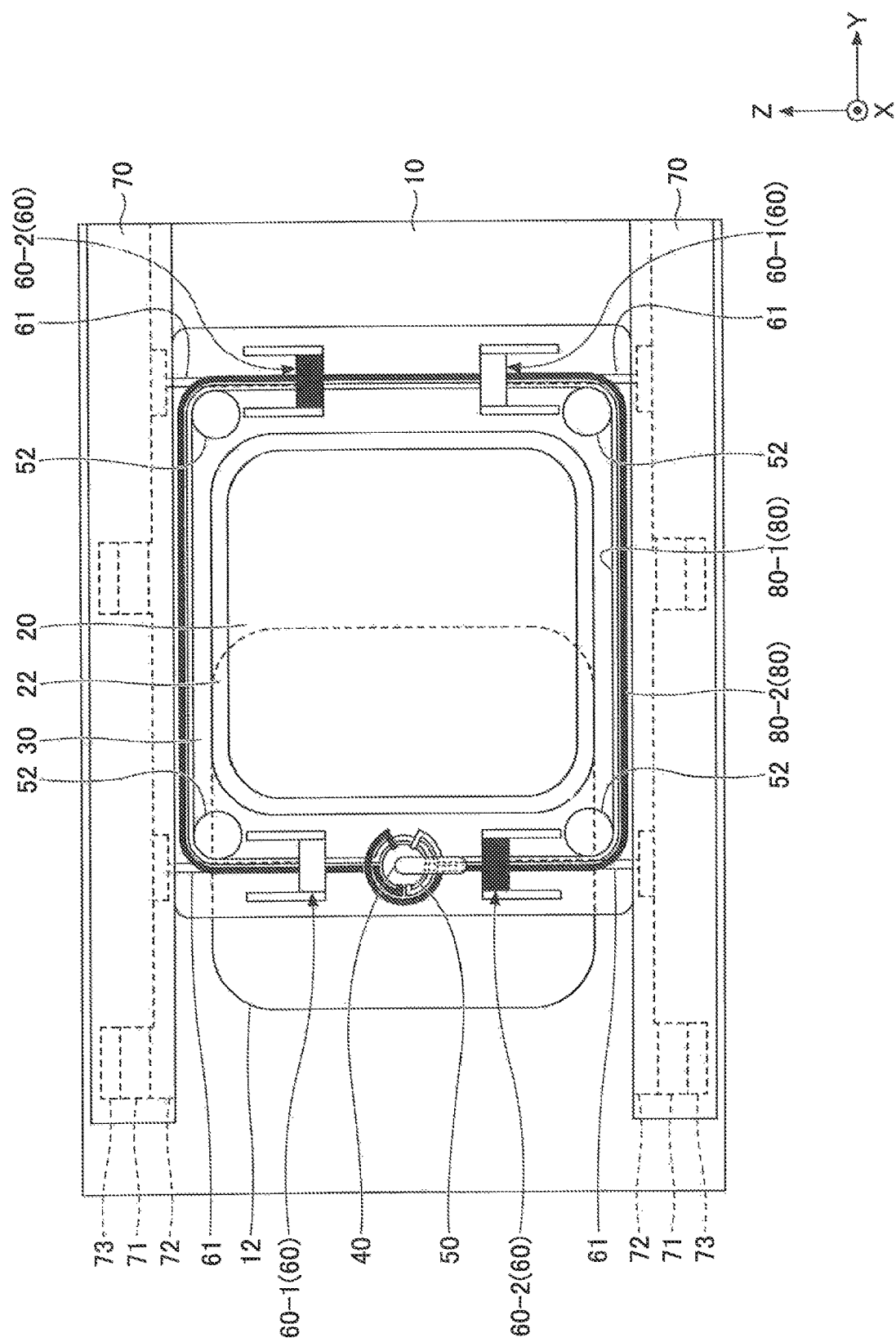
FIG. 3 is a diagram depicting a state of the apparatus for window according to the first embodiment when the sliding window plate is located at an open position.

FIG. 1 is a diagram depicting a state of an apparatus for window according to a first embodiment when a sliding window plate is located at an insertion position. FIG. 2 is a diagram depicting a state of the apparatus for window according to the first embodiment when the sliding window plate is located at an extraction position. FIG. 3 is a diagram depicting a state of the apparatus for window according to the first embodiment when the sliding window plate is located at an open position.

A fixed window plate 10 is mounted on an opening portion of a vehicle such as a car, for example, an opening portion of a building, or the like. In the following, in the specification of the present application, the case where the fixed window plate 10 is mounted on an opening of a vehicle will be described. The fixed window plate 10 is formed of a transparent material such as a glass or a resin. The fixed window plate 10 may have a single layered structure or may have a multi-layered structure. The fixed window plate 10 has an opening portion 12 (See FIG. 3).

A sliding window plate 20 is formed of a transparent material such as a glass or a resin, in the same way as the fixed window plate 10. The sliding window plate 20 is inserted into the opening portion 12 of the fixed window plate 10. At this time, a seal member 22 seals a gap between the fixed window plate 10 and the sliding window plate 20. The seal member 22 is attached to the sliding window plate 20 along an outer edge.

The sliding window plate 20 moves between an insertion position at which the sliding window plate 20 is inserted into the opening portion 12 of the fixed window plate 10, an extraction position which is shifted from the insertion position in the X-direction and at which the sliding window plate 20 is extracted from the opening portion 12, and an open position which is shifted from the extraction position in the Y-direction and at which the sliding window plate 20 uncovers the opening portion 12.

The apparatus for window is used for moving the sliding window plate 20 with respect to the fixed window plate 10. The apparatus for window includes a sliding base 30, an operation member 40, a rotary member 50, a drive member 60, a fixation guide 70 and a wire 80.

The sliding window plate is fixed to the sliding base 30. The sliding window plate 20 moves with the sliding base 30. The sliding base 30 supports the operation member 40, the rotary member 50, the drive member 60 and the like in addition to the sliding window plate 20. The sliding base 30 supports the operation member 40 free to turn, supports the rotary member 50 free to rotate, and supports the drive member 60 free to move in the Z-direction. Note that the sliding base 30 may not be present, and the rotary member 50, the drive member 60, or the like may be arranged directly on the sliding window plate 20.

The operation member 40 is supported free to turn with respect to the sliding base 30. The operation member 40 extends from a center line of rotation of the rotary member 50 outwardly in a radial direction, and turns around the center line of rotation of the rotary member 50. An operation force by an operator can be controlled by adjusting a length of the operation member 40. Note that the operation member 40 is turned manually by the operator, but may be turned by a drive device such as a motor.

The rotary member 50 is supported free to rotate with respect to the sliding base 30. The rotary member 50 is rotated by the operation force from the operation member 40. A direction of an axis of rotation of the rotary member 50 is the X-direction. Note that the rotary member 50 may be rotated by an operation force directly applied by the operator not via the operation member 40.

The drive member 60 is moved by a rotation force of the rotary member 50 with respect to the sliding base 30 in the Z-direction. According to the operation, the drive member 60 receives a reaction force from the fixation guide 70, and moves the sliding base 30 with respect to the fixation guide 70 in the X-direction, using an X-direction component of the reaction force.

Figure 4A:
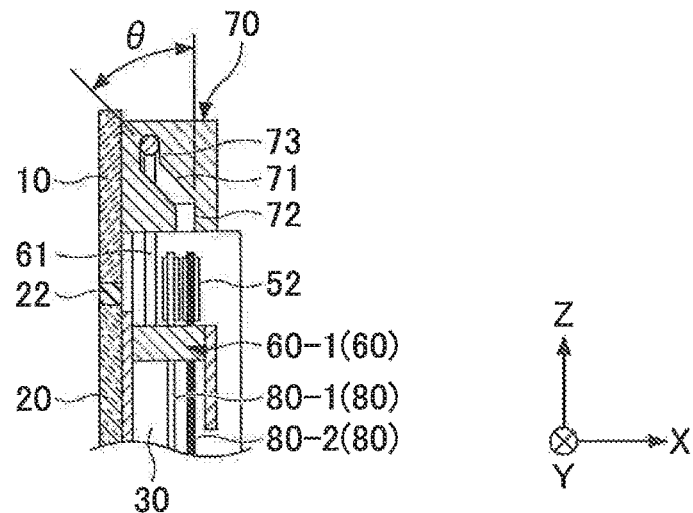
FIGS. 4A and 4B are cross-sectional diagrams depicting a relationship between a fixation guide and a drive member according to the first embodiment.
Figure 4B:
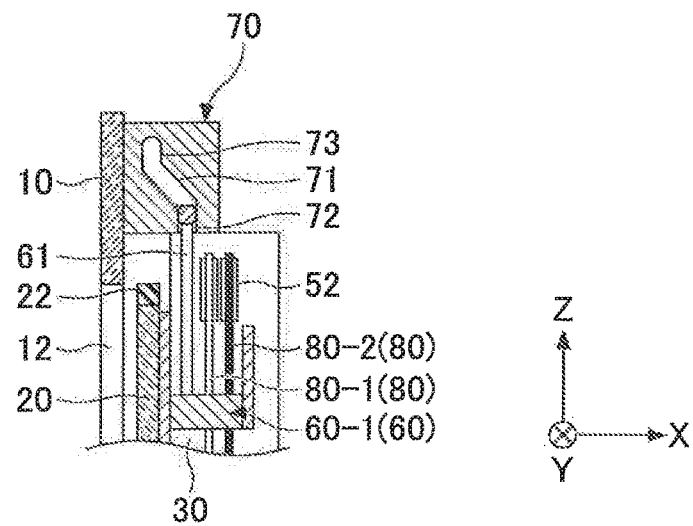

FIGS. 4A and 4B are cross-sectional diagrams depicting a relationship between the fixation guide 70 and the drive member 60 according to the first embodiment. FIG. 4A is a cross-sectional diagram cut along a line A-A, illustrated in in FIG. 1, in the case where the sliding window plate is located at the insertion position. FIG. 4B is a cross-sectional diagram cut along a line B-B, illustrated in FIG. 3, in the case where the sliding window plate is located at the extraction position.

The fixation guide 70 is fixed with respect to the fixed window plate 10. The fixation guide 70 converts the movement of the drive member 60 with respect to the sliding base 30 in the Z-direction into a movement of the sliding window plate 20 with respect to the fixed window plate 10 in the X-direction.

The fixation guide 70 has an inclined groove 71, and the drive member 60 has a pin 61 that is loosely fitted to the inclined groove 71. The inclined groove 71 is inclined so that when proceeding in the Z-direction the groove is shifted in the X-direction. A tip portion of the pin 61 moves along the inclined groove 71. The inclined groove 71 converts a movement of the drive member 60 with respect to the sliding base 30 in the Z-direction into a movement of the sliding window plate 20 with respect to the fixed window plate 10 in the X-direction.

An inclined angle θ of the inclined groove 71 is, for example, 30° or more and 60° or less, and is preferably 45°.

The fixation guide 70 further has a slide groove 72 coupled to the inclined groove 71. An extension direction of the slide groove 72 is the Y-direction. The slide groove 72 guides the tip portion of the pin 61 in the Y-direction. When the tip portion of the pin 61 moves along the slide groove 72, the movement of the sliding window plate 20 with respect to the fixed window plate 10 in the Y-direction can be stabilized.

The fixation guide 70 further has a lock groove 73 coupled to the inclined groove 71. The lock groove 73 is arranged on a side of the inclined groove 71 opposite to the slide groove 72. The lock groove 73 restricts a movement of the tip portion of the pin 61 in the X-direction and in the Y-direction. When the tip portion of the pin 61 is fitted to the lock grove 73, a movement of the sliding window plate 20 with respect to the fixed window plate 10 in the X-direction and in the Y-direction can be locked.

When the movement of the sliding window plate 20 at the insertion position in the X-direction is locked, the sliding window plate 20 does not move to the extraction position even if an external force from a vehicle external side to a vehicle internal side is applied to the sliding window plate 20 located at the insertion position. Thus, intrusion of someone from the vehicle outside into the vehicle inside can be prevented.

The fixation guide 70 may be arranged on both sides of the sliding base 30 in the Z-direction, as illustrated in FIG. 1. To each fixation guide 70, one or more drive members 60 (two members in FIGS. 1 to 3) are loosely fitted. The plurality of drive members 60 may be arranged symmetrically with respect to a center of the sliding base 30. It is possible to push the sliding base 30 in the X-direction with stability.

The wire 80 pulls the drive member 60 with respect to the sliding base 30 in the Z-direction according to the rotation force of the rotary member 50, and moves the drive member 60 with respect to the sliding base 30 in the Z-direction. At least one end portion of the wire 80 is fixed to an outer periphery of the rotary member 50. The rotary member 50 rotates, and thereby winds the wire 80 on the outer periphery, and the wire 80 pulls the drive member 60. Because a force is transmitted via the wire 80, a space for a transmission path for force can be reduced, compared with the conventional case in which a force is transmitted by a link mechanism.

The wire 80 is in contact with an outer periphery of a pulley 52 along the course of the wire. The pulley 52 changes a direction of a tensile force of the wire 80 that is in contact with the outer periphery. The wire 80 may be arranged in a loop shape so as to surround the sliding window plate 20 viewed in the X-direction.

For both end portions of the wire 80 being fixed to the outer periphery of the rotary member 50, the wire 80 is wound up by the rotary member 50 on the outer periphery, and at the same time the wire 80 is unwound from the outer periphery of the rotary member 50. Because winding and unwinding of the wires are performed simultaneously, an installation space of the wire 80 can be reduced.

A total length of the wire 80 being wound by the rotary member 50 and a total length of the wire 80 being unwound from the rotary member 50, while the sliding window plate 20 moves from one of the insertion position and the extraction position to the other, are the same. The wire 80 can be prevented from loosening.

A speed of the wire 80 being wound up by the rotary member 50 (length per unit time) and a speed of the wire 80 being unwound from the rotary member 50 (length per unit time), while the sliding window plate 20 moves from one of the insertion position and the extraction position to the other, are the same. The wire 80 can be prevented from loosening.

A plurality of wires 80 may be arranged. A first wire 80-1 is coupled only to a first drive member 60-1 and is not coupled to a second drive member 60-2 by penetrating through the second drive member 60-2, or the like. Thus, the first wire 80-1 pulls the first drive member 60-1 and does not pull the second drive member 60-2. In contrast, a second wire 80-2 is coupled only to the second drive member 60-2 and is not coupled to the first drive member 60-1 by penetrating through the first drive member 60-1, or the like. Thus, the second wire 80-2 pulls the second drive member 60-2 and does not pull the first drive member 60-1.

A tensile force of the first wire 80-1 and a tensile force of the second wired 80-2 act in opposite directions to each other. One of the tensile forces acts in a clockwise direction, and the other acts in a counterclockwise direction.

The first wire 80-1 and the second wire 80-2 always wind around the outer periphery of rotary member 50 symmetrically, as illustrated in FIGS. 1 to 3. Thus, the rotary member 50 operates with stability.

The outer periphery of the rotary member 50 has a cross section with a shape of a circle. The speed of the wire 80 being wound and the speed of the wire 80 being unwound are easily adjusted to be an equal amount. Thus, the wire 80 can be prevented from loosening.

Next, with reference to FIGS. 1 to 4 again, an operation of the apparatus for window having the aforementioned configuration will be described. First, the operation of moving the sliding window plate 20 from the insertion position, through the extraction position, to the open position will be described.

The operator turns the operation member 40 in the clockwise direction from the position illustrated in FIG. 1 to the position illustrated in FIG. 2. The rotary member 50 rotates in the clockwise direction, the wire 80 pulls the drive member 60 in the Z-direction, and the tip portion of the pin 61 moves from a position illustrated in FIG. 4A to a position illustrated in FIG. 4B. Specifically, the tip portion of the pin 61 exits from the lock groove 73, and moves along the inclined groove 71 while pressed onto a lower surface of the inclined groove 71 toward the slide groove 72.

In this period, the fixation guide 70 converts a movement of the drive member 60 in the Z-direction with respect to the sliding base 30 into a movement of the sliding window plate 20 in the X-direction with respect to the fixed window plate 10. The sliding window plate 20 moves from the insertion position toward the extraction position. When the tip portion of the pin 61 goes through the inclined groove 71, and arrives at the slide groove 72, as illustrated in FIG. 4B, the sliding window plate 20 reaches the extraction position.

Afterwards, the operator pushes the operation member 40 from the position illustrated in FIG. 2 to the position illustrated in FIG. 3, and thereby moves the sliding base 30, i.e. the sliding window plate 20, in the Y-direction. Thus, the sliding window plate 20 moves from the extraction position to the open position.

In this period, the tip portion of the pin 61 moves along the slide groove 72 from the position illustrated in FIG. 2 to the position illustrated in FIG. 3. The slide groove 72 stabilizes the movement of the sliding window plate 20 in the Y-direction.

Next, an operation for the apparatus for window in the case of moving the sliding window plate 20 from the open position, through the extraction position, to the insertion position will be described.

The operator pushes the operation member 40 leftward from the position illustrated in FIG. 3 to the position illustrated in FIG. 2, and thereby moves the sliding base 30, i.e. the sliding window plate 20, in the Y-direction. Thus, the sliding window plate 20 moves from the open position to the extraction position.

In this period, the tip portion of the pin 61 moves along the slide groove 72 from the position illustrated in FIG. 3 to the position illustrated in FIG. 2. The slide groove 72 stabilizes the movement of the sliding window plate 20 in the Y-direction.

Afterwards, the operator turns the operation member 40 in a counterclockwise direction from the position illustrated in FIG. 2 to the position illustrated in FIG. 1. The rotary member 50 rotates in the counterclockwise direction, the wire 80 pulls the drive member 60 in the Z-direction, and the tip portion of the pin 61 moves from the position illustrated in FIG. 4B to the position illustrated in FIG. 4A. Specifically, the tip portion of the pin 61 exits from slide groove 72, and moves along the inclined groove 71 while pressed onto an upper surface of the inclined groove 71 toward the lock groove 73.

In this period, the fixation guide 70 converts a movement of the drive member 60 in the Z-direction with respect to the sliding base 30 into a movement of the sliding window plate 20 in the X-direction with respect to the fixed window plate 10. The sliding window plate 20 moves from the extraction position toward the insertion position. When the tip portion of the pin 61 goes through the inclined groove 71, and arrives at the lock groove 73, as illustrated in FIG. 4A, the sliding window plate 20 reaches the insertion position.

The sliding window plate 20 is flush with the fixed window plate 10 at the insertion position, and forms a continuous surface with the fixed window plate 10. A noise such as a travelling wind can be reduced.

When the sliding window plate 20 is at the insertion position, as illustrated in FIG. 1 or the like, the lock groove 73 restricts a movement of the tip portion of the pin 61 in the X-direction and the Y-direction. Thus, the movement of the sliding window plate 20 with respect to the fixed window plate 10 in the X-direction and the Y-direction can be locked.

When the movement in the X-direction of the sliding window plate 20 at the insertion position is locked, even if an external force is applied from the vehicle external side to the vehicle internal side to the sliding window plate 20 at the insertion position, the sliding window plate 20 does not move to the extraction position. Therefore, it becomes possible to prevent someone from breaking into the vehicle from the vehicle external side to the vehicle internal side.

Variation of the First Embodiment

Figure 5A:
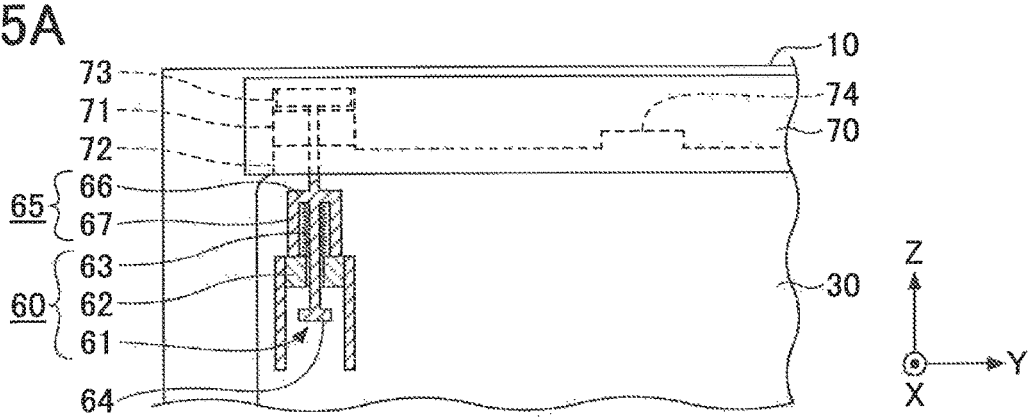
FIGS. 5A, 5B, 5C, and 5D are diagrams depicting a relationship between a fixation guide and a drive member according to a variation of the first embodiment by cutting a part of the drive member.
Figure 5B:
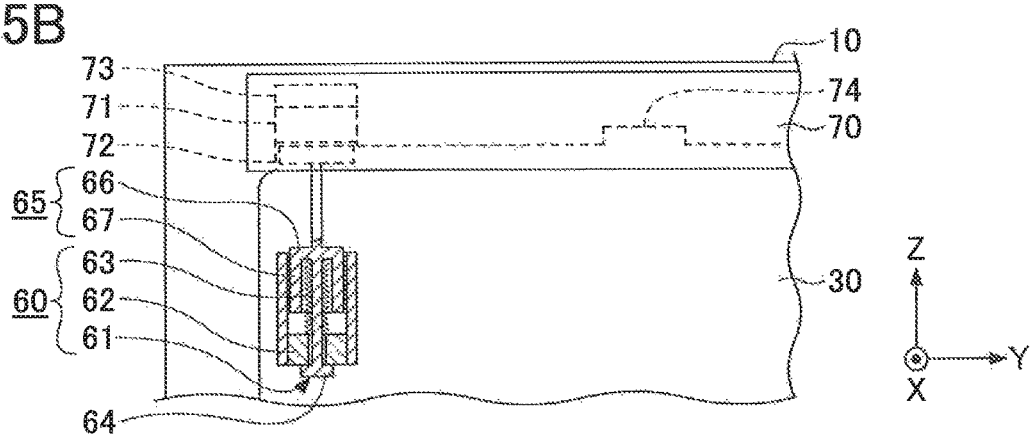
Figure 5C:
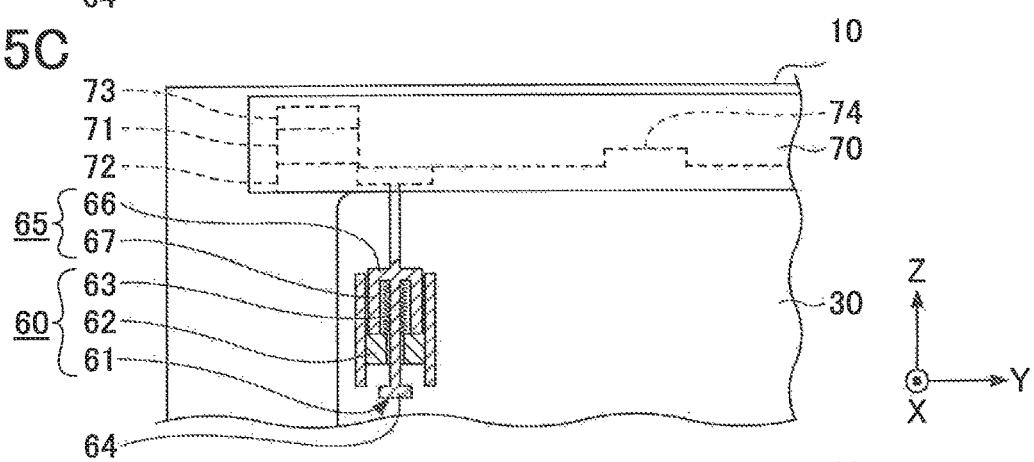
Figure 5D:
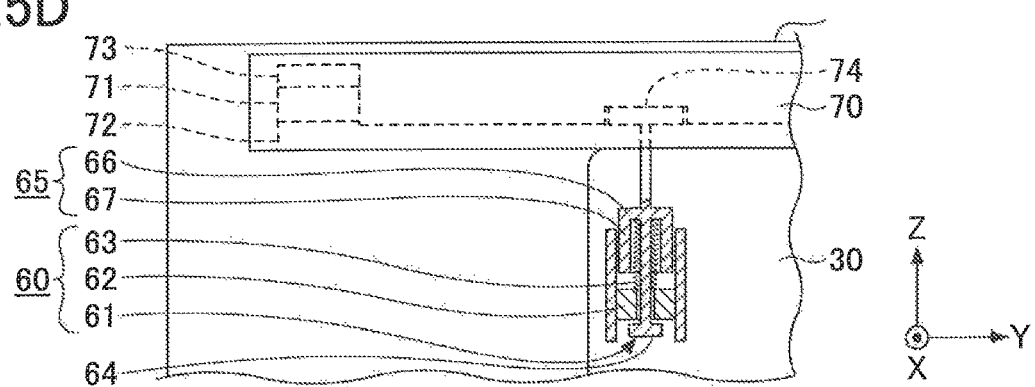

FIGS. 5A, 5B, 5C, and 5D are diagrams depicting a relationship between the fixation guide and the drive member according to a variation of the first embodiment by cutting a part of the drive member. FIG. 5A illustrates a case where the sliding window plate is located at the insertion position. FIG. 5B illustrates a case where the sliding window plate is located at the extraction position. FIG. 5C illustrates a case where the sliding window plate is located at a position that is shifted from the extraction position toward an intermediate position. FIG. 5D illustrates a case where the sliding window plate is located at the intermediate position.

In the variation of the first embodiment, the slide groove 72 has a recess portion 74 so that the sliding window plate 20 can temporarily stop with stability at the intermediate position between the extraction position and the open position. The recess position 74 causes the sliding window plate 20 to temporarily stop at the intermediate position between the extraction position and the open position. In the case where the operator slides the sliding window plate 20 in the Y-direction with respect to the fixed window plate 10, when the sliding window plate reaches the intermediate position, a spring 63 presses the top portion of the pin 61 against the recess portion 74 according to an elastic restoring force of the spring 63.

The drive member 60 has a pin 61 having a tip portion that is to be in contact with the fixation guide 70, a block 62 that is to be connected to the wire 80, and a spring 63 that applies force to the pin 61 in a direction away from the block 62. The direction of force from the spring 63 is the Z-direction. The spring 63 is, for example, a compression spring, and used in a compressed state. Note that the type of the spring 63 is not particularly limited.

The pin 61 is inserted into a penetration hole that penetrates the block 62 in the Z-direction, and is movable in the Z-direction with respect to the block 62. The pin 61 has a flange 64 at an end portion of the pin 61 opposite to the tip portion. The flange 64 is greater than the penetration hole of the block 62.

The pin 61 has a spring holder 65 on the opposite side of the flange 64 with the block 62 in between. The spring holder 65 has an opposite part 66 opposite to the block 62, and a cylindrical part 67 that extends from an outer periphery of the opposite part 66 toward the block 62. The opposite part 66 and the block 62 are arranged along a distance in the Z-direction. The spring 63 is arranged between the opposite part and the block 62.

Next, with reference to FIGS. 5A, 5B, 5C, and 5D or the like, an operation of the drive member 60 will be described. First, the operation of the drive member 60 will be described in the case of moving the sliding window plate 20 from the insertion position, through the extraction position, to the intermediate position.

When the sliding window plate 20 is located at the insertion position, as illustrated in FIG. 5A, the block 62 is in contact with the cylindrical part 67 of the spring holder 65. At this time, the spring 63 is compressed in the Z-direction, and presses the tip portion of the pin 61 against the lock groove 73 according to the elastic restoring force of the spring 63.

When the operator turns the operation member 40 in the above-described state in the clockwise direction from a position illustrated in FIG. 1 to a position illustrated in FIG. 2, the wire 80 pulls the block 62 in the Z-direction (in detail, in a direction of reducing a compression amount of the spring 63). The block 62 is separated from the cylindrical part 67 of the spring holder 65, is pressed to the flange 64 of the pin 61, and moves the flange 64 in the Z-direction. As a result, the tip portion of the pin 61 moves from the position illustrated in FIG. 5A to the position illustrated in FIG. 5B. Specifically, the tip portion of the pin 61 exits from the lock groove 73, moves along the inclined groove 71 while pressed onto a lower surface of the inclined groove 71, and reaches the slide groove 72.

Afterwards, the sliding window plate 20 is shifted from the extraction position toward the intermediate position. When the operation turns the operation member 40 in the counterclockwise direction from the position illustrated in FIG. 2, the wire 80 pulls the block 62 in the Z-direction (in detail, in a direction of enlarging a compression amount of the spring 63). The block 62 is separated from the flange 64 of the pin 61, as illustrated in FIG. 5C, and approaches the cylindrical part 67 of the spring holder 65.

In this state, the operator slides the sliding window plate 20 toward the intermediate position. When the sliding window plate 20 reaches the intermediate position, even if the operator does not perform an operation, as illustrated in FIG. 5D, the spring 63 presses the tip portion of the pin 61 to the recess portion 74 of the slide groove according to the elastic restoring force of the spring 63. Thus, the sliding window plate 20 can temporarily stop with stability at the intermediate position between the extraction position and the open position.

Next, an operation of the drive member 60 in the case of moving the sliding window plate 20 from the intermediate position, through the extraction position, to the insertion position will be described.

When the sliding window plate is located at the intermediate position, as illustrated in FIG. 5D, the block 62 is separated from the flange 64 of the pin 61. At this time, the spring 63 is compressed in the Z-direction, and presses the tip portion of the pin 61 to the recess portion 74 of the slide groove 72 according to the elastic restoring force of the spring 63.

When the operator turns the operation member 40 in this state in the clockwise direction toward the position illustrated in FIG. 2, the wire 80 pulls the block 62 in the Z-direction (in detail, in a direction of reducing a compression amount of the spring 63). The block 62 is pressed on the flange 64 of the pin 61, and moves the flange 64 in the Z-direction. As a result, the tip portion of the pin 61 exits from the recess portion 74 of the slide groove 72, and can be slid in the Y-direction. The state of the drive member 60 at this time is the same as the state illustrated in FIG. 5B, and illustration will be omitted.

Subsequently, the operation slides the sliding window plate 20 from the intermediate position to the extraction position. When the sliding window plate is located at the extraction position, as illustrated in FIG. 5B, the tip portion of the pin 61 is loosely fitted to the slide groove 72, and the block 62 is pressed against the flange 64 of the pin 61.

Afterwards, when the operator turns the operation member 40 in the counterclockwise direction from the position illustrated in FIG. 2 to the position illustrated in FIG. 1, the wire 80 pulls the block 62 in the Z-direction (in detail, in a direction of enlarging a compression amount of the spring 63). The block 62 is separated from the flange 64 of the pin 61, is pressed against the cylindrical part 67 of the spring holder 65, and moves the cylindrical part 67 in the Z-direction. As a result, the tip portion of the pin 61 moves from the position illustrated in FIG. 5B to the position illustrated in FIG. 5A. Specifically, the tip portion of the pin 61 exits from the slide groove 72, moves along the inclined groove 71 while pressed onto an upper surface of the inclined groove 71, and reaches the lock groove 73.

Second Embodiment

In the first embodiment, a movement direction of the drive member 60 with respect to the sliding base 30 was the Z-direction. In contrast, in the second embodiment, a movement direction of the drive member 60 with respect to the sliding base 30 is the Y-direction.

Figure 6:
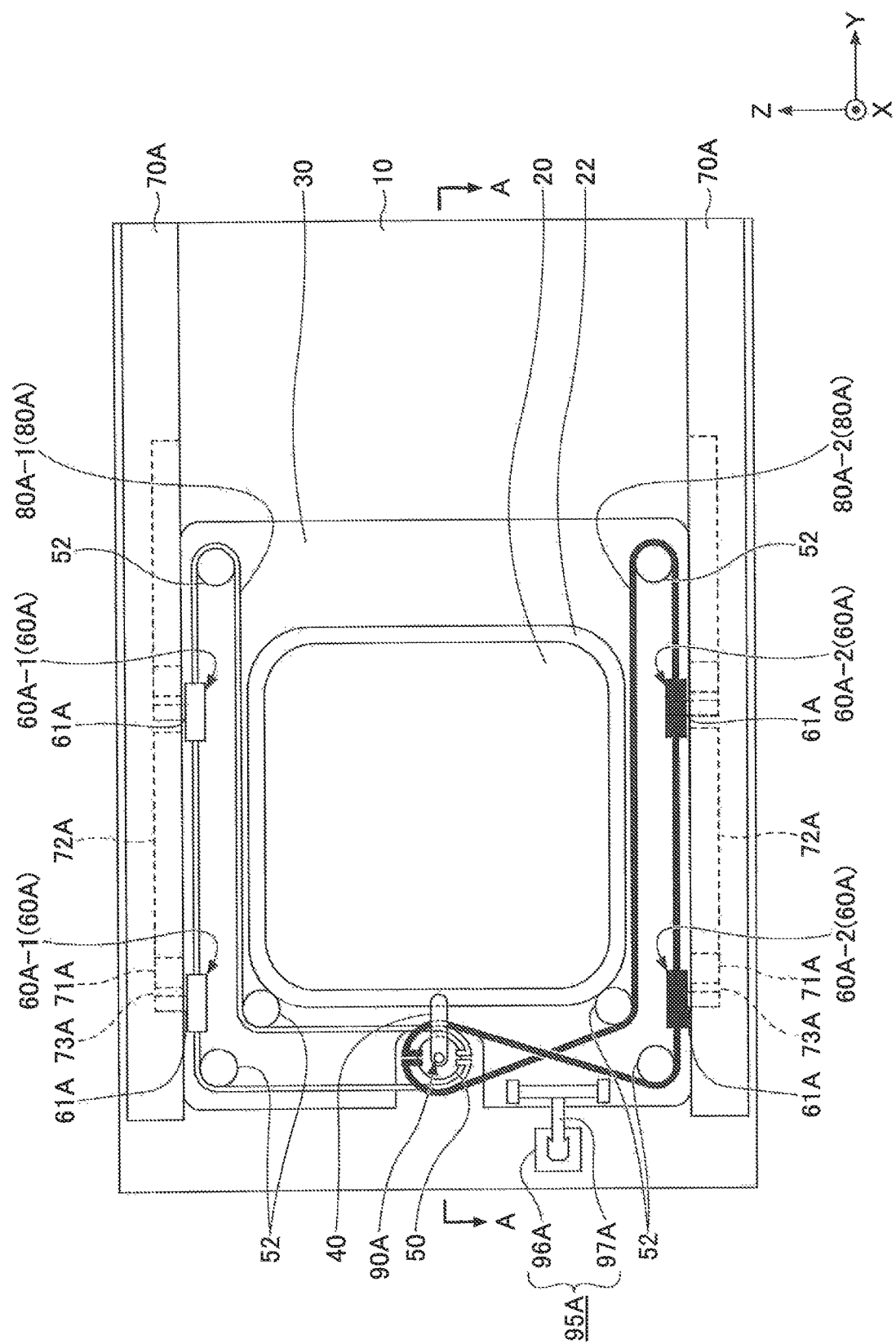
FIG. 6 is a diagram depicting a state of an apparatus for window according to a second embodiment when a sliding window plate is located at an insertion position.
Figure 7:
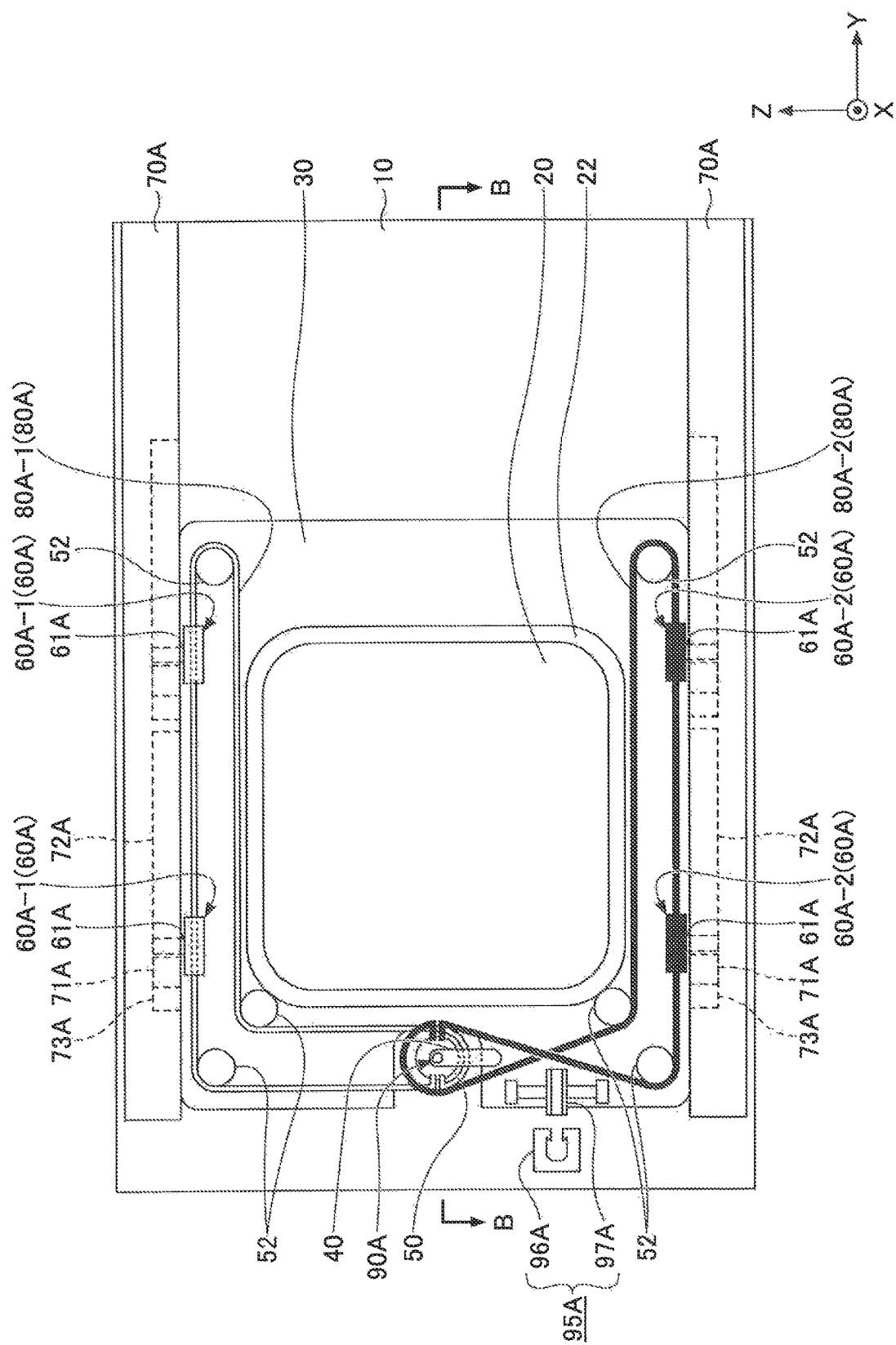
FIG. 7 is a diagram depicting a state of the apparatus for window according to the second embodiment when the sliding window plate is located at an extraction position.
Figure 8:
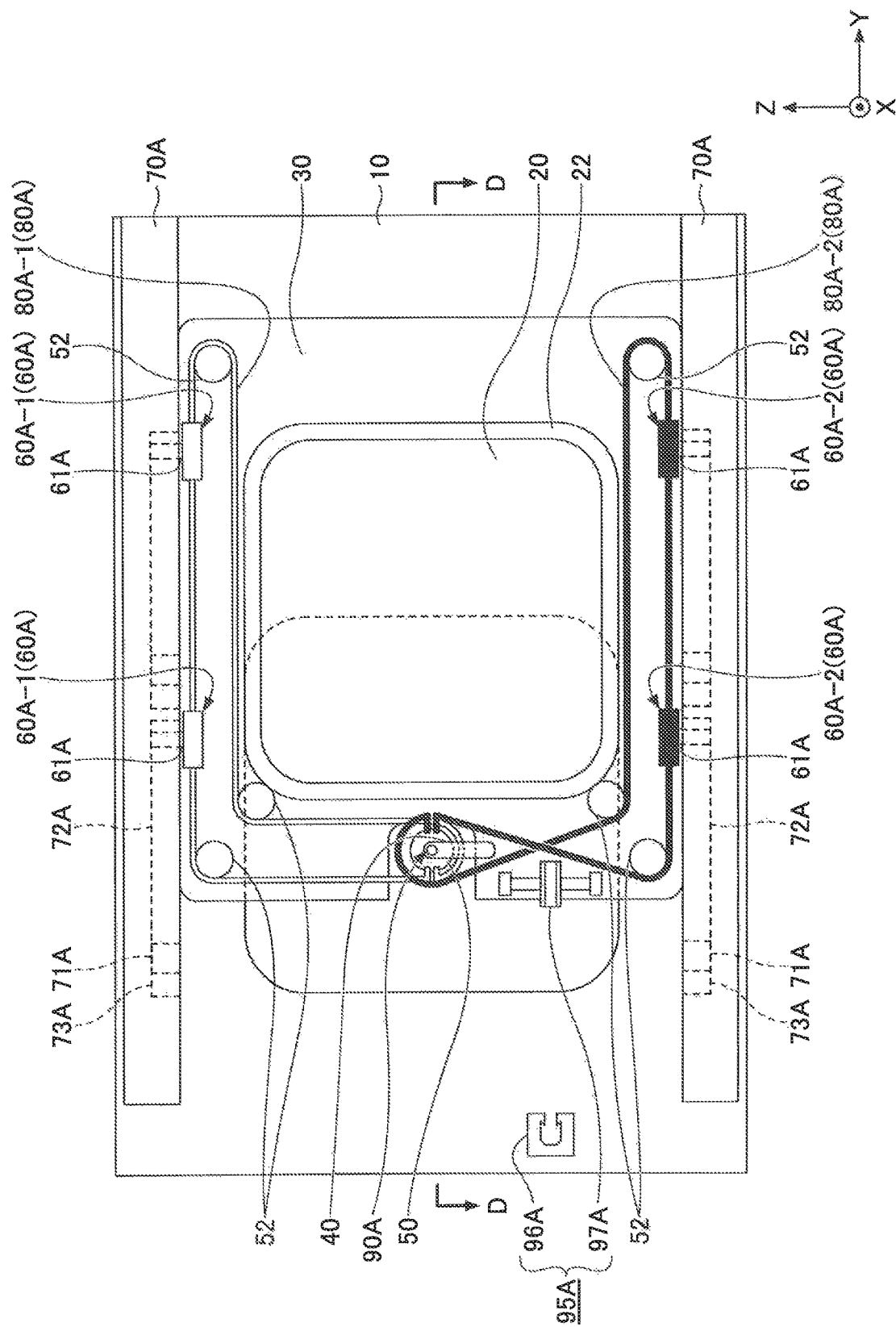
FIG. 8 is a diagram depicting a state of the apparatus for window according to the second embodiment when the sliding window plate is located at an open position.

FIG. 6 is a diagram depicting a state of an apparatus for window according to the second embodiment when a sliding window plate is located at an insertion position. FIG. 7 is a diagram depicting a state of an apparatus for window according to the second embodiment when the sliding window plate is located at an extraction position. FIG. 8 is a diagram depicting a state of an apparatus for window according to the second embodiment when the sliding window plate is locate at an open position.

The apparatus for window is used for moving the sliding window plate 20 with respect to the fixed window plate 10. The apparatus for window includes a sliding base 30, an operation member 40, a rotary member 50, a drive member 60A, a fixation guide 70A, a wire 80A, a slide restriction mechanism 90A, and a lock mechanism 95A.

The drive member 60A moves in the Y-direction with respect to the sliding base 30 by a rotation force of the rotary member 50. Thus, the drive member 60A receives a reaction force from the fixation guide 70A, and moves the sliding base 30 with respect to the fixation guide 70A in the X-direction, using an X-direction component of the reaction force.

Figure 9A:
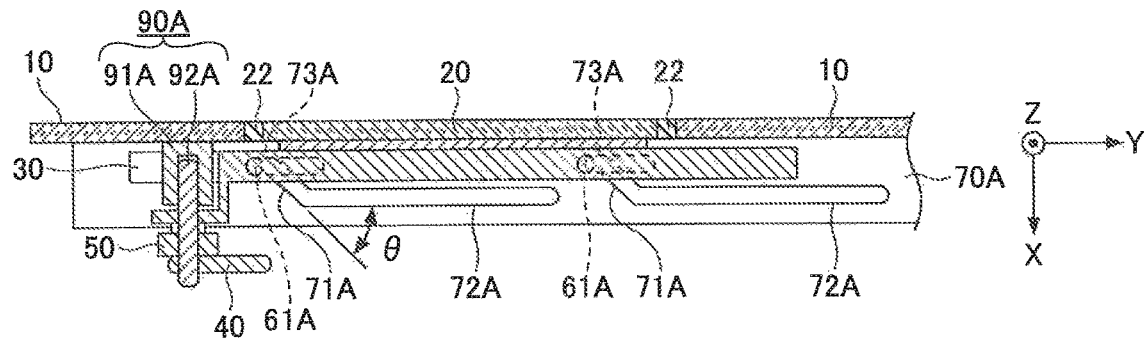
FIGS. 9A, 9B, 9C, and 9D are cross-sectional diagrams depicting a relationship between a fixation guide and a drive member according to the second embodiment.
Figure 9B:
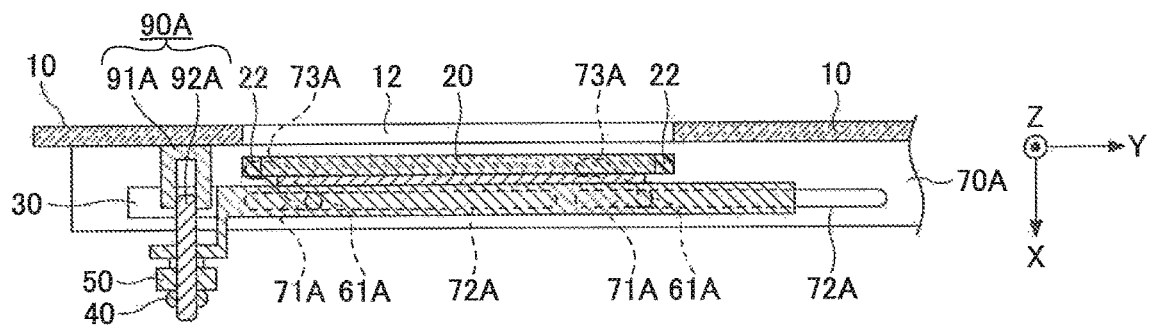
Figure 9C:
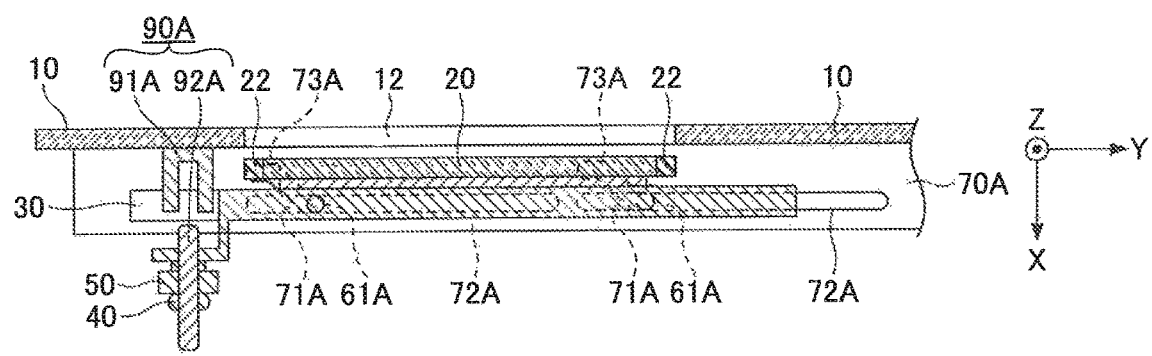
Figure 9D:
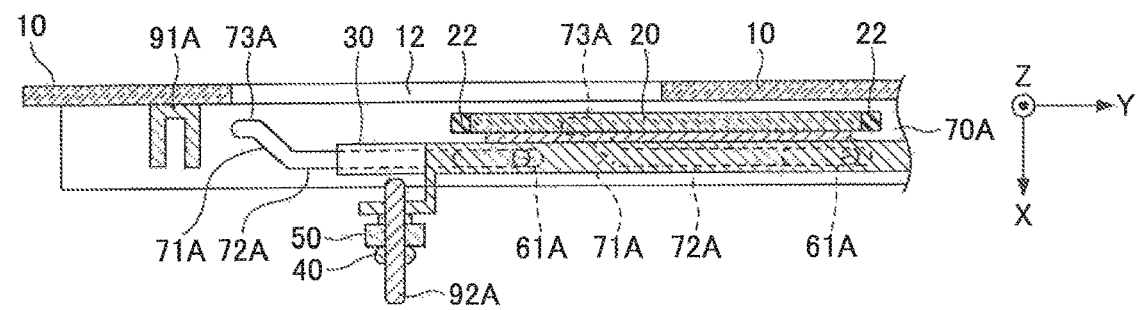

FIGS. 9A, 9B, 9C, and 9D are cross-sectional diagrams depicting a relationship between the fixation guide and the drive member according to the second embodiment. FIG. 9A is a cross-sectional diagram cut along a line "A-A" in FIG. 6 in the case where the slide restriction for the sliding window plate is performed and the sliding window plate is located at the insertion position. FIG. 9B is a cross-sectional diagram cut along a line "B-B" in FIG. 7 in the case where the slide restriction for the sliding window plate is performed and the sliding window plate is located at the extraction position. FIG. 9C is a cross-sectional diagram in the case where the slide restriction for the sliding window plate is released and the sliding window plate is located at the extraction position. FIG. 9D is a cross-sectional diagram cut along a line "D-D" in FIG. 8 in the case where the slide restriction for the sliding window plate is released and the sliding window plate is located at the open position.

The fixation guide 70A is fixed with respect to the fixed window plate 10. The fixation guide 70A converts a movement of the drive member 60A in the Y-direction with respect to the sliding base 30 into a movement of the sliding window plate 20 in the X-direction with respect to the fixed window plate 10.

The fixation guide 70 has an inclined groove 71A, and the drive member 60A has a pin 61A loosely fitted to the inclined groove 71A. The inclined groove 71A is inclined so that when proceeding in the Y-direction the groove is shifted in the X-direction. A tip portion of the pin 61A moves along the inclined groove 71A. The inclined groove 71A converts a movement of the drive member 60A with respect to the sliding base 30 in the Y-direction into a movement of the sliding window plate 20 with respect to the fixed window plate 10 in the X-direction.

An inclined angle θ of the inclined groove 71A is, for example, 30° or more and 60° or less, and is preferably 45°.

The fixation guide 70A further has a slide groove 72A to be coupled to the inclined groove 71A. The slide groove 72A extends in the Y-direction. The slide groove 72A guides the tip portion of the pin 61A in the Y-direction. The tip portion of the pin 61A moves along the slide groove 72A, and thereby the movement of the sliding window plate 20 in the Y-direction with respect to the fixed window plate 10 can be stabilized.

The fixation guide 70A further has a stopper groove 73A to be coupled to the inclined groove 71A. The stopper groove 73A is arranged on an end of the inclined groove 71A opposite to the slide groove 72A. The stopper groove 73A restricts a movement of the tip portion of the pin 61A to one side in the X-direction.

Because the movement of the tip portion of the pin 61A to one side in the X-direction is restricted, even if an external force is applied from the vehicle external side to the vehicle internal side to the sliding window plate 20 located at the insertion position, the sliding window plate 20 does not move to the extraction position. Thus, intrusion of someone from the vehicle outside into the vehicle inside can be prevented.

The fixation guide 70A may be arranged on both sides of the sliding base 30 in the Z-direction, as illustrated in FIG. 6 or the like. One or more (two in FIGS. 6 to 8) drive members 60A are loosely fitted to each fixation guide 70A. The plurality of drive members 60A may be arranged symmetrically with respect to a center of the sliding base 30. It is possible to push the sliding base 30 in the X-direction with stability.

The wire 80A pulls the drive member 60A with respect to the sliding base 30 in the Y-direction according to the rotation force of the rotary member 50, and moves the drive member 60A with respect to the sliding base 30 in the Y-direction. At least one end portion of the wire 80A is fixed to an outer periphery of the rotary member 50. The rotary member 50 rotates, and thereby winds the wire 80A on the outer periphery, and the wire 80A pulls the drive member 60A. Because a force is transmitted via the wire 80A, a space for a transmission path for force can be reduced, compared with the conventional case in which a force is transmitted by a link mechanism.

The wire 80A is in contact with an outer periphery of a pulley 52 in the middle of the wire. The pulley 52 changes a direction of a tensile force of the wire 80A that is in contact with the outer periphery. The wire 80A may be arranged so as not to overlap with the sliding window plate 20 viewed in the X-direction.

For both end portions of the wire 80A being fixed to the outer periphery of the rotary member 50, the wire 80A is wound up by the rotary member 50 on the outer periphery, and at the same time the wire 80A is unwound from the outer periphery of the rotary member 50. An installation space of the wire 80A can be reduced.

A plurality of wires 80A may be arranged. The first wire 80A-1 pulls the first drive member 60A-1 and does not pull the second drive member 60A-2. In contrast, a second wire 80A-2 pulls the second drive member 60A-2 and does not pull the first drive member 60A-1.

The first wire 80A-1 and the second wire 80A-2 always wind around the outer periphery of rotary member 50 symmetrically, as illustrated in FIGS. 6 to 8. Thus, the rotary member 50 operates with stability.

The outer periphery of the rotary member 50 has a cross section with a shape of a circle. The amount of winding of the wire 80A and the amount of unwinding of the wire 80A are easily adjusted to be an equal amount. Thus, the wire 80A can be prevented from loosening.

The slide restriction mechanism 90A, as illustrated in FIG. 9A to FIG. 9B, when the operation member 40 is operated (i.e. when the rotary member 50 rotates), restricts a movement of the sliding window plate 20 in the Y-direction with respect to the fixed window member 10. When the operation member 40 is operated, the movement of the drive member 60A in the Y-direction with respect to the sliding base 30 can be securely converted into a movement of the sliding window plate 20 in the X-direction with respect to the fixed window member 10. The slide restriction mechanism 90A has, for example, a retainer 91A and a slide restriction rod 92A.

The retainer 91A is fixed to the fixed window plate 10, and the slide restriction rod 92A is mounted to the sliding base 30. The retainer 91A retains the slide restriction rod 92A from the Y-direction, and thereby restricts a movement of the sliding window plate 20 in the Y-direction with respect to the fixed window plate 10.

The slide restriction rod 92A is movably supported in the X-direction with respect to the sliding base 30. The slide restriction rod 92A moves between a restriction position, at which sliding of the sliding window plate 20 with respect to the fixed window plate 10 is restricted (See FIG. 9A and FIG. 9B), and an open position, at which the aforementioned restriction of the sliding (See FIG. 9C and FIG. 9D) is released.

The slide restriction rod 92A penetrates through the operation member 40, the rotary member 50, or the like, and moves along the center line of rotation of the rotary member 50. The slide restriction rod 92A is operated independently from the operation member 40.

The lock mechanism 95A, as illustrated in FIG. 6, locks the sliding window plate 20 at the insertion position. The lock mechanism 95A has, for example, a receiver 96A and a locking tool 97A. The receiver 96A is fixed to the fixed window plate 10, and the locking tool 97A is mounted to the sliding base 30. The receiver 96A is engaged with an anchor shaped tip portion of the locking tool 97A, and thereby locks the sliding window plate 20 at the insertion position.

The locking tool 97A is rotatably supported with respect to the sliding base 30. The direction of a rotational axis of the locking tool 97A is the Z-direction. The locking tool 97A turns between a lock position (See FIG. 6) at which the sliding window plate 20 is locked at the insertion position and a lock release position (See FIG. 7 and FIG. 8) at which the lock is released.

Next, with reference to FIG. 6, FIGS. 9A to 9D again, an operation of the apparatus for window with the aforementioned configuration will be described. First, an operation of moving the sliding window plate 20 from the insertion position, through the extraction position, to the open position will be described.

The operator releases the lock by the lock mechanism 95A, and at the same time, performs the slide restriction by the slide restriction mechanism 90A, and then, turns the operation member 40 in the clockwise direction from the position illustrated in FIG. 6 to the position illustrated in FIG. 7. The rotary member 50 rotates in the clockwise direction, the wire 80A pulls the drive member 60A in the Y-direction, and the tip portion of the pin 61A moves from the position illustrated in FIG. 9A toward the position illustrated in FIG. 9B. Specifically, the tip portion of the pin 61A exits from the stopper groove 73A, and moves along the inclined groove 71A while pressed onto a wall surface on the vehicle external side of the inclined groove 71A toward the slide groove 72A.

In this period, the fixation guide 70A converts a movement of the drive member 60A in the Y-direction with respect to the sliding base 30 into a movement of the sliding window plate 20 in the X-direction with respect to the fixed window plate 10. The sliding window plate 20 moves from the insertion position toward the extraction position. When the tip portion of the pin 61A goes through the inclined groove 71A, and arrives at the slide groove 72A, as illustrated in FIG. 9B, the sliding window plate 20 reaches the extraction position.

Afterwards, the operator releases the slide restriction by the slide restriction mechanism 90A, as illustrated in FIG. 9C, and pushes the operation member 40 from the position illustrated in FIG. 7 to the position illustrated in FIG. 8, and thereby moves the sliding base 30, i.e. the sliding window plate 20, to the Y-direction. Thus, the sliding window plate 20 moves from the extraction position to the open position.

In this period, the tip portion of the pin 61A moves along the slide groove 72A from the position illustrated in FIG. 9C to the position illustrated in FIG. 9D. The slide groove 72A stabilizes the movement of the sliding window plate 20 in the Y-direction.

Next, an operation for the apparatus for window in the case of moving the sliding window plate 20 from the open position, through the extraction position, to the insertion position will be described.

The operator pushes the operation member 40 leftward from the position illustrated in FIG. 8 to the position illustrated in FIG. 7, and thereby moves the sliding base 30, i.e. the sliding window plate 20, in the Y-direction. Thus, the sliding window plate 20 moves from the open position to the extraction position.

In this period, the tip portion of the pin 61A moves along the slide groove 72A from the position illustrated in FIG. 9D to the position illustrated in FIG. 9C. The slide groove 72A stabilizes the movement of the sliding window plate 20 in the Y-direction.

Afterwards, the operator performs the slide restriction by the slide restriction mechanism 90A, as illustrated in FIG. 9B, and turns the operation member 40 in a counterclockwise direction from the position illustrated in FIG. 7 to the position illustrated in FIG. 6. The rotary member 50 rotates in the counterclockwise direction, the wire 80A pulls the drive member 60A in the Y-direction, and the tip portion of the pin 61A moves from the position illustrated in FIG. 9B to the position illustrated in FIG. 9A. Specifically, the tip portion of the pin 61A exits from slide groove 72A, and moves along the inclined groove 71A while pressed onto a wall surface on the vehicle internal side of the inclined groove 71A toward the lock groove 73A.

In this period, the fixation guide 70A converts a movement of the drive member 60A in the Y-direction with respect to the sliding base 30 into a movement of the sliding window plate 20 in the X-direction with respect to the fixed window plate 10. Thus, the sliding window plate 20 moves from the extraction position toward the insertion position. When the tip portion of the pin 61A goes through the inclined groove 71A, and arrives at a stopper groove 73A, as illustrated in FIG. 9A, the sliding window plate 20 reaches the insertion position.

The sliding window plate 20 is flush with the fixed window plate 10 at the insertion position, and forms a continuous surface with the fixed window plate 10. A noise such as a travelling wind can be reduced. The sliding window plate 20 is locked by the lock mechanism 95A at the insertion position.

Note that the slide groove 72A according to the embodiment does not include a recess portion that causes the sliding window plate 20 to temporarily stop at an intermediate position between the extraction position and the open position, but may include the recess portion in the same way as the variation of the first embodiment, described as above.

As described above, the preferred embodiments and the like of the apparatus for window have been described. However, the present invention is not limited to the above-described specific embodiments, but various variations and modifications may be made without departing from the scope of the present invention recited in claims.

REFERENCE SIGNS LIST 10 fixed window plate
20 sliding window plate
30 sliding base
40 operation member
50 rotary member
60 drive member
70 fixation guide
80 wire

What is claimed is:

1. An apparatus for a window used for moving a sliding window plate between
   an insertion position, at which the sliding window plate is inserted into an opening portion of a fixed window plate,
   an extraction position, at which the sliding window plate is extracted from the opening portion, and
   an open position, at which the sliding window plate is shifted in a slide direction that is different from an extraction/insertion direction from the extraction position, and the sliding window plate uncovers the opening portion,
   the apparatus for a window comprising:
   a rotary member that is rotatably supported on a sliding base with respect to the sliding window plate;
   a drive member that is moved in a predetermined direction that is different from the extraction/insertion direction with respect to the sliding window plate according to a rotation force of the rotary member;
   a fixation guide configured to convert a movement of the drive member in the predetermined direction with respect to the sliding window plate into a movement of the sliding window plate in the extraction/insertion direction with respect to the fixed window plate,
   wherein the fixation guide has a slide groove configured to guide the drive member in the slide direction,
   wherein the slide groove has a recess portion configured to temporarily stop the sliding window plate at an intermediate position between the extraction position and the open position; and
   a wire configured to pull the drive member in the predetermined direction according to the rotation force of the rotary member, and move the drive member in the predetermined direction,
   wherein the drive member includes
     a pin having a tip portion in contact with the fixation guide,
     a block to be coupled to the wire, and
     a spring configured to apply force to the pin in a direction away from the block, and
   wherein the spring presses the pin against the recess portion according to an elastic restoring force of the spring.

2. The apparatus for a window according to claim 1,
   wherein the wire comprises two end portions that are fixed to an outer periphery of the rotary member,
   wherein, as the rotary member rotates, a first portion of the wire is wound up onto the outer periphery of the rotary member, and at the same time, a second portion of the wire is unwound from the outer periphery of the rotary member.

3. The apparatus for a window according to claim 2,
   wherein a total amount of winding of the first portion of the wire and a total amount of unwinding of the second portion of the wire, while the sliding window plate moves from one of the insertion position and the extraction position to an other of the insertion position and the extraction position, are the same.

4. The apparatus for a window according to claim 2,
   wherein a speed of the first portion of the wire being wound up by the rotary member and a speed of the second portion of the wire being unwound from the rotary member, while the sliding window plate moves from one of the insertion position and the extraction position to an other of the insertion position and the extraction position, are the same.

5. The apparatus for a window according to claim 2,
   wherein the wire includes a plurality of wires, and
   wherein the plurality of wires wind around the outer periphery of the rotary member symmetrically.

6. The apparatus for a window according to claim 2,
   wherein the outer periphery of the rotary member has a cross section with a shape of a circle.

7. The apparatus for a window according to claim 1,
   wherein the predetermined direction is different from the extraction/insertion direction and the slide direction.

8. The apparatus for a window according to claim 1 further comprising
   the sliding base to which the sliding window plate is fixed,
   wherein the rotary member and the drive member are arranged on the sliding base.

9. The apparatus for a window according to claim 1, further comprising the sliding base supporting the sliding window plate and rotatably supporting the rotary member,
   wherein the fixation guide comprises a lock groove that the drive member is at least partially positioned within in the insertion position, wherein the lock groove prevents movement of the sliding window plate in the slide direction and in the extraction/insertion direction.

* * * * *